Sept. 4, 1923.
C. A. SNIDER
AIRSHIP
Filed Oct. 19, 1921
1,466,732
4 Sheets-Sheet 1
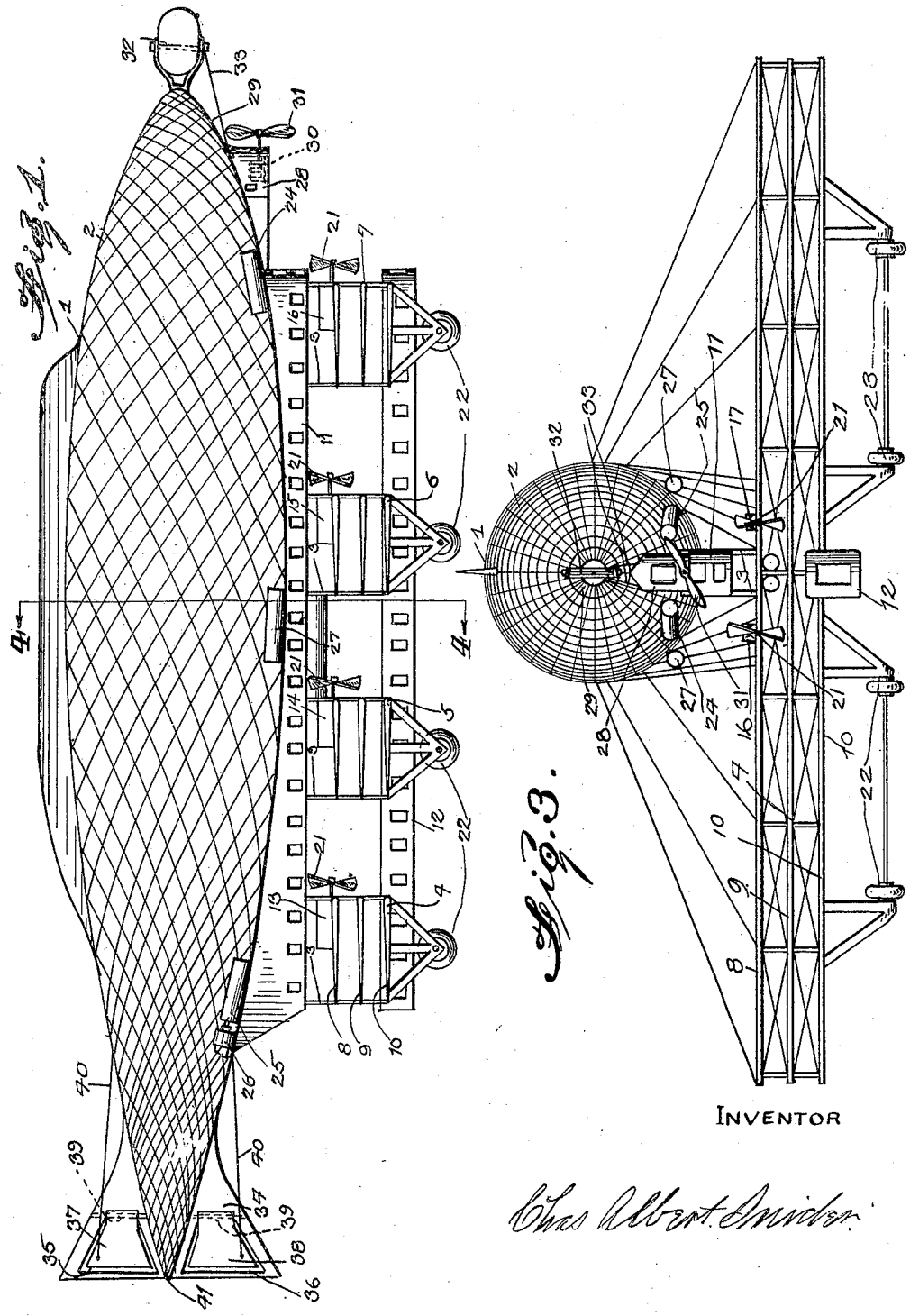
INVENTOR
Chas Albert Snider Sept. 4, 1923.

C. A. SNIDER

AIRSHIP

Filed Oct. 19, 1921

INVENTOR

Chas Albert Snider

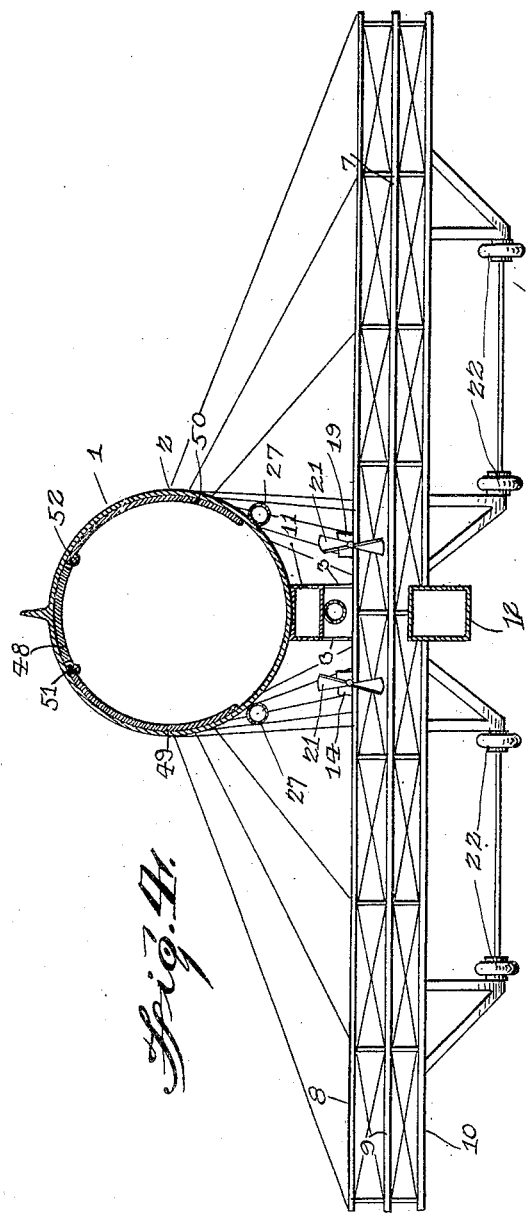

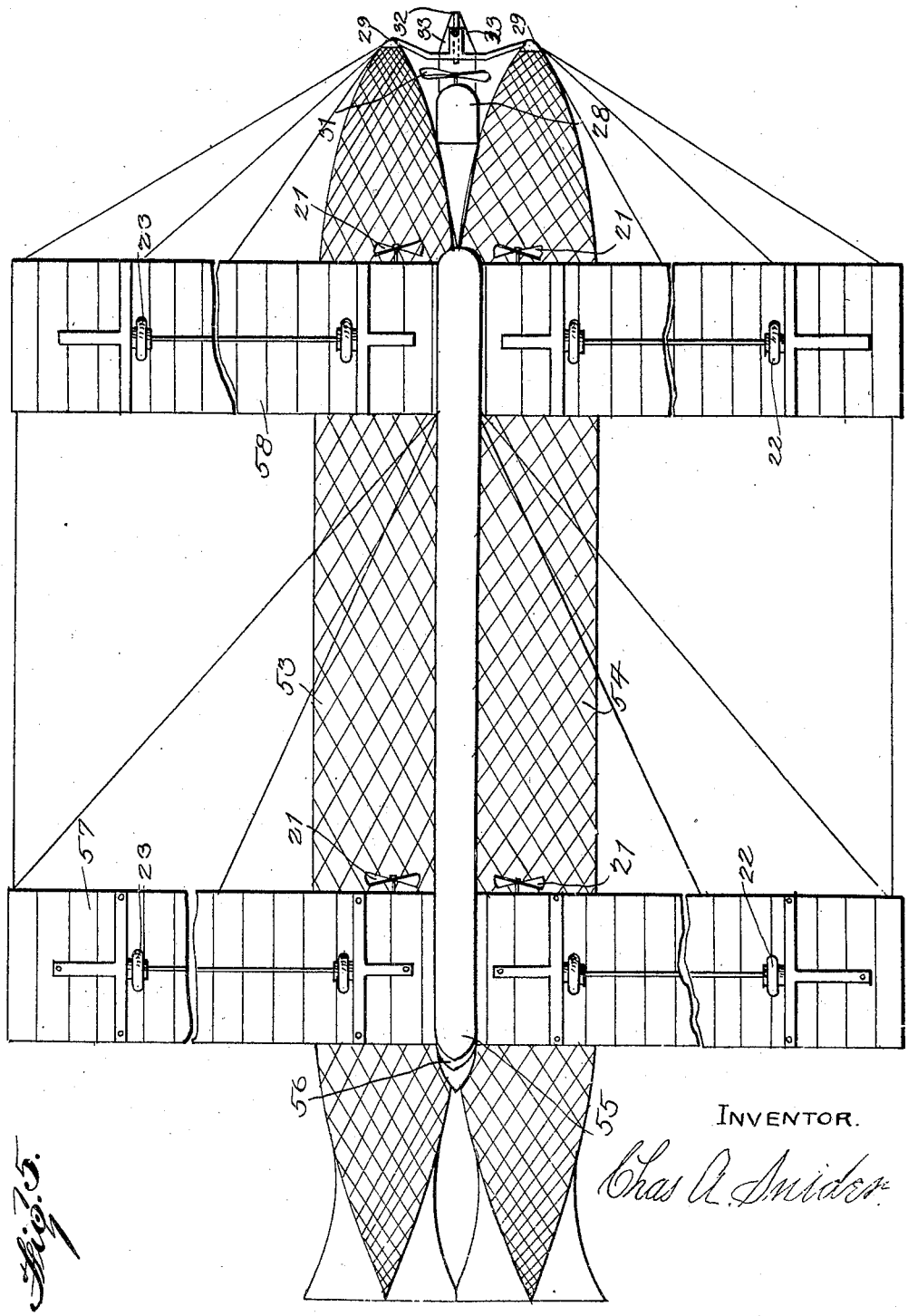

Patented Sept. 4, 1923.

1,466,732

UNITED STATES PATENT OFFICE.

CHARLES ALBERT SNIDER, OF ATLANTA, GEORGIA.

AIRSHIP.

Application filed October 19, 1921. Serial No. 508,859.

*To all whom it may concern:*

Be it known that I, CHARLES A. SNIDER, a citizen of the United States, residing at Atlanta, in the county of Fulton and State of Georgia, have invented certain new and useful Improvements in Airships, of which the following is a specification.

This invention relates to improvements in airships and has for its object to provide a combination dirigible and airplane flying machine.

Another object of the invention is to provide a flying machine embracing a gas bag and plurality of planes and a passenger car located between the gas bag and planes.

Another object of the invention is to provide a flying machine consisting of a gas bag and airplane structure suspended from said gas bag, a passenger car between said gas bag and structure and another passenger car beneath such structure.

With the above and such other objects in view as will hereinafter more fully appear, I have invented the device illustrated in the accompanying drawings in which Figure 1 is a side elevational view of my improved airship;

Figure 2 is a bottom plan view thereof;

Figure 3 is an end elevational view of the device;

Figure 4 is a section taken on line 4—4 of Figure 1, and

Figure 5 is a bottom plan view of a modified form of the device.

Like reference characters indicate like parts throughout the following specifications in the several views and drawings in which 1 indicates an airship consisting of a cigar-shaped gas bag 2, from the under side of which is suspended an airplane structure 3, said structure including 4 or more sets of planes 4, 5, 6, and 7 which project beyond each side of the bag 2. Each of the plane structures 4, 5, 6 and 7 includes three planes 8, 9 and 10 suitably spaced apart. Located between the airplane structure 3 and the gas bag 2 is a longitudinal passenger car 11 which extends from the airplane structure 4 in the rear of the machine to the airplane structure 7 at the forward part thereof. A similar passenger car 12 is located beneath the airplane structure 3 and parallel the car 11. Mounted within each of the airplane structures 4 to 7 inclusive are motors 13, 14, 15, 16, 17, etc., respectively, for operating the propellers 21 connected therewith. Under each of the plane structures 4 to 7, inclusive, and connected with the lower planes 10, are two sets of wheels 22 and 23 for supporting the machine upon the ground. On each side of the bag 2 are forward and aft tanks 24 and 25, connected with each of which is a motor 26 whereby the gas contained in the bag 2 may be pumped therefrom and compressed into said tanks 24 and 25 in order that the bag 2 may collapse that the machine may more readily descend when making a landing. On each side of said bag 2, centrally thereof, are storage tanks 27 for gasoline. A pilot room 28 is provided near the forward end 29 of the bag 2, in which is provided a motor 30 for driving the propeller 31 and from which point the pilot rudder 32 may be operated by means of a cable 33. The rear of the bag 2 terminates in a flat fish-tail shaped plane 34, having upper and lower openings 35 and 36, respectively, in which are pivoted vertically disposed steering vanes 37 and 38 mounted upon a common shaft 39 and operated by a cable 40 running to the pilot house 30. A horizontally disposed tail plane 41 has openings 42 and 43 in which vertical movable steering planes 44 and 45 mounted on a common shaft 46 is provided, said latter planes also being controlled through a cable 47 from the pilot house 30.

The frame structure 48 of the bag 2 is made preferably semi-rigid in order that the side walls 49 and 50 may swing in from the points 51 and 52 when the gas is pumped out of the bag in order to permit the same to collapse. The four plane structures 4 to 7 are of sufficient area to carry the machine under the power of its eight engines when the bag 2 is without gas. When the bag 2 is filled with gas it will be able to lift a heavy load and travel at a slow speed from its pilot engine 30 and without necessarily depending upon the planes 4 to 7 and engines therein.

In Figure 5 I show a modification of the invention in which two bags are arranged side by side for supporting the cars 55 and 56 which are suspended from between said bags 53 and 54. The plane structures 57 and 58 are detachably connected to one another and from the framework with which they are connected to the dirigible bags 53 and 54 in order that less than four sets of plane structures may be used if it is found desirable.

The sets of planes 4, 5, 6, etc., may be hingedly supported in such a manner as to permit of their being folded in longitudinally of the upper and lower cars.

Having now described my invention, that which I claim to be new and desire to procure by Letters Patent is:—

1. An airship including a gas bag, a car adjacent the under surface of the gas bag, another car spaced downwardly from the first car, and airplane structures carried between said cars;

2. An airship including a gas bag, a car adjacent the under surface of the gas bag, another car spaced downwardly from the first car, and airplane structures carried between said cars, two motors carried by each of said airplane structures;

3. An airship including a gas bag, a car adjacent the under surface of the gas bag, another car spaced downwardly from the first car, and airplane structures carried between said cars, two motors carried by each of said airplane structures, and a propeller driven by each of said motors;

4. An airship including a gas bag, two spaced apart cars suspended therefrom and airplane structures carried between said cars, two motors carried by each of said airplane structures, and a propeller driven by each of said motors, and compressed gas tanks mounted upon the gas bags.

5. An airship including a gas bag, two spaced apart cars suspended therefrom and airplane structures carried between said cars, two motors carried by each of said airplane structures, and a propeller driven by each of said motors, compressed gas tanks mounted upon the gas bags, a motor for each of said tanks for discharging gas from said bag and compressing the same in said tanks;

6. In a dirigible airship a gas bag a passenger car adjacent the under surface thereof and wheels connected with said ship whereby the same may land upon the ground, another car below and parallel with said first car, and a series of airplane structures supported between said cars;

7. In a dirigible airship a gas bag a passenger car adjacent the under surface thereof and wheels connected with said ship whereby the same may land upon the ground, another car below and parallel with said first car, and a series of airplane structures supported between said cars, said airplanes projecting on each side of said cars;

8. In a dirigible airship a gas bag a passenger car adjacent the under surface thereof and wheels connected with said ship whereby the same may land upon the ground, another car below and parallel with said first car, and a series of airplane structures supported between said cars, said airplanes projecting on each side of said cars, an engine supported by each of said airplanes.

In testimony whereof I affix my signature in the presence of two witnesses.

CHAS. ALBERT SNIDER.

Witnesses:
D. B. D. LAURENCE,
GEO. E. CAMP.